United States Patent
Fergason

[11] Patent Number: 5,414,546
[45] Date of Patent: May 9, 1995

[54] DYNAMIC OPTICAL NOTCH FILTER

[76] Inventor: James L. Fergason, 92 Adam Way, Atherton, Calif. 94025

[21] Appl. No.: 158,711

[22] Filed: Nov. 24, 1993

Related U.S. Application Data

[63] Continuation of Ser. No. 72,348, Jun. 3, 1993, abandoned, which is a continuation of Ser. No. 869,048, Apr. 14, 1992, abandoned, which is a continuation of Ser. No. 713,542, Jun. 7, 1991, abandoned, which is a continuation of Ser. No. 561,804, Aug. 2, 1990, abandoned, which is a continuation of Ser. No. 230,790, Aug. 10, 1988, abandoned.

[51] Int. Cl.$^6$ .............. G02F 1/1335; G02F 1/1347; G02F 1/23
[52] U.S. Cl. ...................... 359/73; 359/93; 359/94; 359/105; 359/253; 252/299.6; 252/299.67; 252/299.7
[58] Field of Search .......... 350/347 R, 347 E, 347 V, 350/337, 349, 350 R, 389, 390; 359/246, 249, 250, 252, 253, 278, 63, 73, 93, 94, 105, 53, 259; 252/299.7, 299.6, 299.67

[56] References Cited

U.S. PATENT DOCUMENTS

| | | |
|---|---|---|
| Re. 32,521 | 10/1987 | Fergason .............. 350/334 |
| 2,591,701 | 4/1952 | Jaffe . |
| 3,239,671 | 3/1966 | Buhrer . |
| 3,290,619 | 12/1966 | Geusic et al. . |
| 3,423,686 | 1/1969 | Ballman et al. . |
| 3,446,966 | 5/1969 | Peterson . |
| 3,945,715 | 3/1976 | Drake . |
| 4,017,156 | 4/1977 | Moriyama et al. . |
| 4,061,417 | 12/1977 | Katagiri . |
| 4,232,948 | 11/1980 | Shanks ............ 350/347 R |
| 4,239,349 | 12/1980 | Scheffer . |
| 4,251,137 | 2/1981 | Knop et al. ............ 350/347 V |
| 4,279,474 | 7/1981 | Belgorod . |
| 4,385,806 | 5/1983 | Fergason . |
| 4,436,376 | 3/1984 | Fergason ............. 350/332 |
| 4,443,065 | 4/1984 | Funada et al. . |
| 4,444,469 | 4/1984 | Kaye . |
| 4,462,661 | 7/1984 | Witt . |
| 4,465,969 | 8/1984 | Tada et al. . |
| 4,540,243 | 9/1985 | Fergason ............. 350/337 |
| 4,541,691 | 9/1985 | Buzak ............. 350/335 |
| 4,583,825 | 4/1986 | Buzak ............. 350/335 |
| 4,674,841 | 6/1987 | Buzak ............. 350/337 |
| 4,726,663 | 2/1988 | Buzak ............. 350/347 E |
| 4,765,719 | 8/1988 | Fergason . |
| 4,770,500 | 9/1988 | Kalmanash et al. .......... 350/347 E |
| 4,988,167 | 1/1991 | Fergason . |
| 5,113,271 | 5/1992 | Fergason . |

OTHER PUBLICATIONS

Hartshorne & Stuart, *Crystals and The Polarising Microscope*, 4th ed., American Elsevier Publishing Co. Inc. (New York, 1970) pp. 309-314.

Primary Examiner—Martin Lerner
Attorney, Agent, or Firm—Renner, Otto, Boisselle & Sklar

[57] ABSTRACT

Apparatus for filtering a wavelength of light includes a variable polarization rotator for supplying linearly polarized input light at a prescribed angle of polarization, a cholesteric liquid crystal variable dispersion device for rotating the plane of polarization of the plane polarized light from the variable polarization rotator an amount that is a function of the wavelength of such input light, and analyzer for blocking transmission of that light which is output by said variable dispersion device and has a plane of polarization which is crossed relative to the axis of polarization of the analyzer, while transmitting at least part of the light which does is not plane polarized in a direction that is crossed relative to the analyzer.

8 Claims, 1 Drawing Sheet

DYNAMIC OPTICAL NOTCH FILTER

This is a continuation of application Ser. No. 08/072,348, filed on Jun. 3, 1993, which now abandoned is a continuation application of U.S. Ser. No. 07/869,048, filed Apr. 14, 1992, now abandoned which is a continuation application of U.S. Ser. No. 07/713,542, filed Jun. 7, 1991, now abandoned which is a continuation application of U.S. Ser. No. 07/561,804, filed Aug. 2, 1990, now abandoned which is a continuation application of U.S. Ser. No. 07/230,790, filed Aug. 10, 1988, now abandoned.

TECHNICAL FIELD

The present invention relates generally, as is indicated, to optical notch filters, and, more particularly, to a dynamic notch filter that is able to filter one or more particular wavelengths or frequencies from white light or light that contains multiple wavelengths or frequencies. Although the invention is disclosed particularly with respect to light in the visible spectrum, it will be appreciated that features of the invention may be employed with electromagnetic radiation in other spectra.

CROSS-REFERENCE TO RELATED APPLICATION

Reference is made to applicant's concurrently filed U.S. patent application Ser. No. 07/230,789, for System For Continuously Rotating Plane Of Polarized Light And Apparatus Using The Same, the entire disclosure of which hereby is incorporated by reference.

BACKGROUND

In certain circumstances it is desirable to filter from input light, light of one (or more) particular wavelength or frequency. For example, in a circumstance where white light contains a particular color that is to be eliminated, e.g., due to the high intensity thereof or the particular sensitivity of that on which such light is directed, it is desirable to be able to eliminate such undesirable color, wavelength or frequency. Although a conventional color filter can filter a single color, a conventional color filter is fixed; it is not able to be adjusted to change the wavelength or frequency of operation, i.e., at which it filters light.

It would be desirable to be able to select or to alter the wavelength or frequency of light that is filtered by a color filter device, and especially to do so without blocking (or minimizing blocking of) transmission of light that is not undesirable. The present invention provides such capabilities.

When linearly polarized light (sometimes referred to as plane polarized light) is directed through an optically active crystal that exhibits double refraction, such crystal divides the incoming light into an ordinary ray and an extraordinary ray, which are vibrating in relatively orthogonal planes. Moreover, such optically active crystal tends to retard one of the rays relative to the other as they travel through the crystal thereby causing a phase difference or separation between the two waves. The phase difference is a function of the actual and effective optical thickness of the optically active crystal, the ordinary and extraordinary indices of refraction thereof, and of the wavelength of the light.

As is known, the general condition for polarized light is that of elliptical polarization. Linear polarization and circular polarization are special cases of elliptical polarization. For example, when linearly polarized light is directed through an optically active crystal that exhibits double refraction such that the axis of polarization and the axis of the crystal are at 45 degrees relative to each other and the thickness of the crystal is such that it retards one of the ordinary ray and extraordinary ray by 90 degrees (pi/2, 3pi/2, 5pi/2, etc.) relative to the other wave, for a particular wavelength of light, the output from the crystal will be circularly polarized light. To have circularly polarized light, the amplitude Ao of the ordinary ray and the amplitude Ae of the extraordinary ray must be equal, and the phase separation thereof must be an odd whole number multiple of 90 degrees. This is the reason for the 45 degrees relation. In such case, the amplitudes Ao, Ae are defined, respectively, by $A(\sin \theta)$ and $A(\cos \theta)$, where A is the amplitude of the incident linearly polarized light to the crystal and $\theta$ (theta) is the angle of the vibrational plane of the electric vector of such incident light with respect to the optical axis of the crystal. When $\theta$ (theta) is 45 degrees, the sine and cosine functions mentioned are equal at 1, and the amplitudes, therefore, are equal.

However, if the amplitudes Ao and Ae mentioned above are not equal, whereby either the input angle $\theta$ (theta) is not 45 degrees and/or the retardation effected by the optically active crystal is not 90 degrees (or an odd whole number multiple thereof), then the more general case of elliptically polarized light occurs. The major axis of the ellipse will be either parallel or perpendicular to the plane of polarization of the incident light to the retarder. As was mentioned above, the retardation effected by optically active crystal is a function of wavelength of the incident light.

The relationships of certain optical components for affecting light, particularly polarized light, is described, for example, in Jenkins and White FUNDAMENTALS OF OPTICS, McGraw-Hill Book Company, New York, 1957. For example, at Chapter 27 of such text, the interference of polarized light is described. Polarized light and use of various optical components with polarized light also are described elsewhere in such text. The entire disclosure of such text is incorporated herein by reference.

A liquid crystal device for phase modulating polarized light is disclosed in U.S. Pat. Nos. 4,385,806 4,436,376, 4,540,243, and Re. 32,521. The disclosures of such patents hereby are incorporated by reference. In such device linearly polarized light is phase-modulated as such light passes through a liquid crystal cell to which a bias voltage signal and a modulated electrical carrier wave signal are applied as an electrical potential to develop an electric field across the liquid crystal material affecting alignment of the liquid crystal structure therein. The light which is transmitted through the liquid crystal cell is phase modulated as a function of the modulated electrical carrier wave signal. More specifically, the liquid crystal cell effectively separates the incident linearly polarized light into the quadrature components, i.e., the ordinary and extraordinary rays, thereof, and effects a retardation of one ray or component relative to the other as the light is transmitted through the cell. The amount of retardation, i.e., the effective optical thickness of the liquid crystal cell, is a function of the modulated electrical carrier wave signal. The liquid crystal cell disclosed in such patents utilizes a so-called surface mode switching technique which is fast acting, for example providing switching response times of as fast as 10 microseconds to 100 microseconds.

An example of an optical dispersion device that rotates the polarization of light incident thereon is a cholesteric liquid crystal cell. Such cell and the characteristics thereof are disclosed in a paper by James L. Fergason, entitled "Cholesteric Structure-I Optical Properties", at pages 89-103. The entire disclosure of such paper hereby is incorporated by reference. Such paper describes the ability of cholesteric liquid crystal material to rotate polarization of light as a function of the wavelength of the light itself.

BRIEF SUMMARY OF THE INVENTION

Briefly, the present invention relates to apparatus for filtering a wavelength of light, including a variable polarization rotator for supplying input light as polarized light at a prescribed angle of polarization, a variable dispersion device for rotating the angle or plane of polarization of such input light an amount that is a function of the wavelength of such input light, and an analyzer for blocking transmission of that light which is output by said variable dispersion device and has a plane or angle of polarization which is crossed relative to the axis of polarization of such analyzer.

The apparatus for rotating polarization of polarized light includes, for example, a source of linearly polarized input light or a means to effect linear polarization of input light, a variable retarder that retards the phase of one quadrature component of such linearly polarized input light an amount relative to the phase of the other quadrature component, and an analyzer that converts the quadrature components from the variable retarder to linearly polarized light that has a plane of polarization which is a function of the amount of such phase retardation.

According to a preferred embodiment, the variable retarder is a liquid crystal cell that operates according to surface mode alignment and switching characteristics in response to electric field input to alter the relative retardation of the ordinary and extraordinary ray components of incident light. Such liquid crystal cell is disclosed in the aforementioned U.S. patents. Preferably, there are two such liquid crystal cells arranged in optical series and driven electrically in push-pull manner, as is described in the above-mentioned U.S. Pat. No. Re. 32,521. Such push-pull operation increases speed of response, enhances accuracy, and increases linearity of the retarder.

An example of a wavelength dependent optical dispersion device is a liquid crystal cell with parallel plate walls, e.g., of glass, with a quantity of cholesteric liquid crystal between the walls.

These and other objects, advantages and features of the invention will become more apparent as the following detailed description proceeds. It will be appreciated, though, that the scope of the invention is to be determined by the scope of the claims and the equivalents thereof.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be employed.

DESCRIPTION OF THE PREFERRED EMBODIMENT

Figure 1:
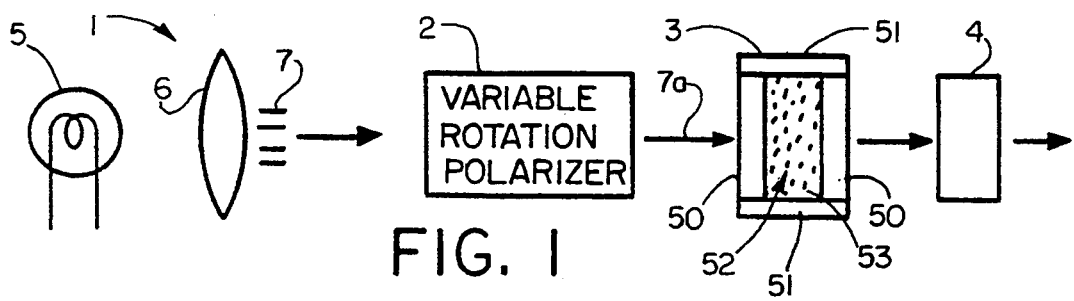
FIG. 1 is a schematic fragmentary view of a dynamic optical notch filter in accordance with the preferred embodiment of the invention.

Referring, now, in detail to the drawings, wherein like reference numerals refer to like parts in the several figures, and initially to FIG. 1, a dynamic optical notch filter according to the invention is designated 1. The filter 1 includes an apparatus for rotating the plane of polarization of polarized light 2, sometimes referred to as a variable rotation polarizer, an optical dispersion device 3 that has a dispersion characteristic which varies as a function of wavelength (or frequency) of light incident thereon, and an analyzer 4 (which may be a linear polarizer). Light from a source 5, which may be collimated by a lens 6 or may be uncollimated, or light from some other source, that has a wavelength intended to be filtered out, is represented at 7 as an input to the variable rotation polarizer 2.

The light 7 incident on the variable rotation polarizer 2 is polarized by the polarizer 2 to produce light 7a that is linearly polarized. The plane of polarization of the light 7a can be rotated to virtually any direction by the variable rotation polarizer 2. The light 7a is incident on the variable dispersion device 3. Such device 3 rotates the plane of polarization of such incident light. The variable dispersion device is of a thickness and of a material(s) that cause a specified amount of rotation of the undesired wavelength of light such that upon leaving such device 3, the plane of polarization of such undesired wavelength is perpendicular to the axis of polarization of the analyzer 4. Therefore, the analyzer 4 will block transmission of such wavelength component. This, though, assumes that the variable rotation polarizer 2 effects a rotation of the plane of polarization of light such that when the undesired wavelength is rotated further by the device 3, it will in fact be at a crossed direction relative to the axis of polarization of the analyzer 4. Therefore, it will be appreciated that by altering rotation effected by the variable rotation polarizer, it will be operative to alter the actual wavelength of light filtered by the downstream dispersion device 3 in combination with the analyzer 4.

Figure 2:
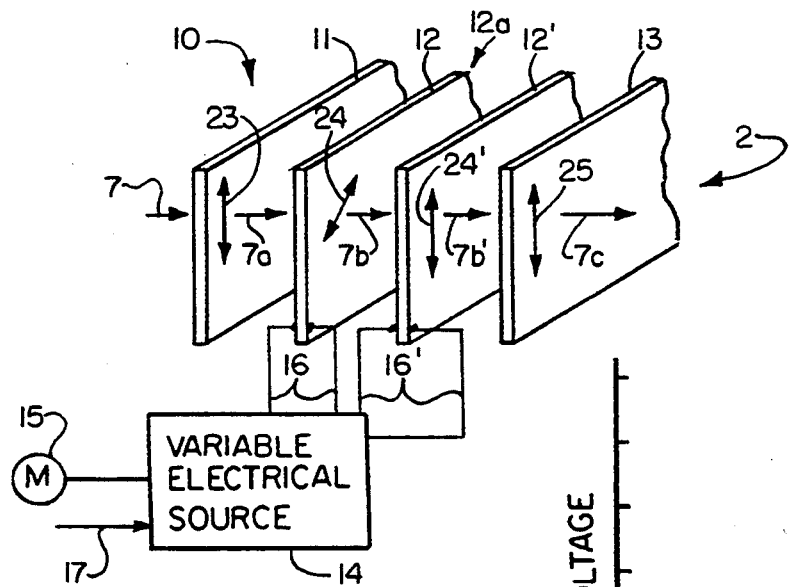
FIG. 2 is a schematic fragmentary view of an apparatus for rotating polarization of polarized light in accordance with the present invention.
Figure 4:
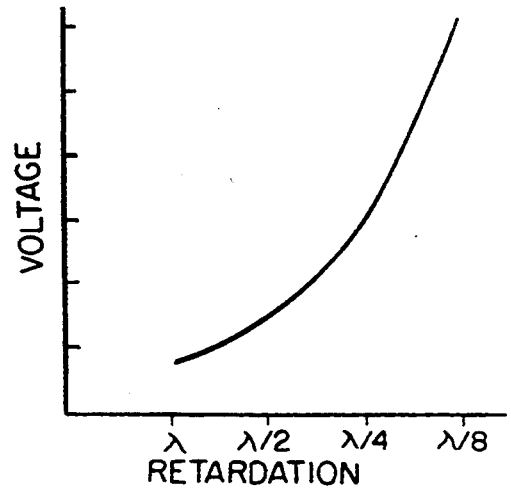
FIG. 4 is a graph of the retardation or phase difference of the quadrature components of polarized light able to be effected by the liquid crystal cell.

Turning to FIG. 2, an apparatus for rotating the polarization of polarized light in accordance with the present invention is generally indicated at 10. The apparatus 10 includes a linear polarizer 11, a variable retarder 12a pair, which includes a pair of variable retarders 12, 12', and an analyzing device 13, such as a quarter wave plate. The apparatus 10 also preferably includes a variable electrical source 14. Associated with the source 14 is a meter or indicator 15, for example, to indicate the voltage applied across the leads 16 to the variable retarder 12, and a conventional mechanism represented as an input 17 for adjusting the voltage of the source. Such input 17 may be a manually adjustable device, such as a potentiometer or the like, may be an automatic device, such as a feedback circuit and control, etc. The variable electrical source 14 may be of the type described in the above patents or some other type.

A light source 5 directs light to the apparatus 10. The light source 5 is illustrated as an incandescent source. However, such light source may be any source, whether a part of the filter 1 or totally independent thereof. Collimation can be provided by means of a collimating lens 6 that directs the collimated light 7 incident on the linear polarizer 11, although collimation is not necessary for operation of the invention.

The linear polarizer 11 may be a conventional linear polarizer that has an axis of polarization or plane of polarization identified by the arrow 23. The electric vector of the light 7a output from the linear polarizer 11 will be vibrating in the direction of the arrow 23. Such light is incident on the retarder 12.

If the light 7 incident on the variable rotation polarizer already is linearly polarized, then the linear polarizer 11 may be omitted from the variable rotation polarizer 2.

The variable rotation polarizer 2 will function with one or a pair of variable retarders 12, 12', which are identical. The description is simplified below by discussing only a single retarder 12. If two are used, then they preferably are operated in push-pull fashion, as is described below and in the above-mentioned reissue patent, to achieve a similar operative effect as with a single retarder but with increased speed, linearity and accuracy.

The variable retarder 12 has an optical axis represented by the double-headed arrow 24. Preferably, such optical axis is oriented at 45 degrees relative to the axis 23 of the linear polarizer. Such retarder preferably is a liquid crystal device and has alignment characteristics of the liquid crystal that provides a constancy of optical axis in the X, Y plane, i.e., across the Z direction along which light propagates, although the alignment of the liquid crystal may change with respect to the Z direction. The variable retarder 12 is intended to operate on the quadrature components of the linearly polarized light 7a incident thereon so as to retard the phase of one quadrature component relative to the other. Such retarding is a function of the voltage applied by the source 14 to the retarder 12, as is described in further detail below and is described in detail in the above-mentioned U.S. patents. The light output 7b from the variable retarder 12 is composed of ordinary and extraordinary light rays that are out of phase with each other by an amount determined by the retarder 12. The extent that such quadrature components are out of phase determines the nature of the elliptical polarization of the light 7b.

If the phase retardation effected by the variable retarder 12 is 90 degrees or is an odd whole number multiple of 90 degrees (pi/2, 3pi/2, 5pi/2, etc.) then the light 7b will be circularly polarized because the above-described conditions of the 45 degree relationship of the incident linearly polarized light 7a and the optical axis 24 of the retarder 12 is met and the amplitudes of the ordinary and extraordinary rays will be equal. If the retardation is other than 90 degrees or an odd whole number multiple thereof, then the light 7b will be elliptically polarized, but not circularly polarized.

The quarter wave plate 13 has the optical axis 25 thereof oriented in parallel with the optical axis 23 of the linear polarizer 11 and at 45 degrees relative to the optical axis 24 of the variable retarder 12. The quarter wave plate 13 is intended to convert the elliptically (including circularly) polarized light 7b which is incident thereon to linearly polarized light 7c. (Note in the immediate description it is assumed that light 7b is transmitted directly to the quarter wave plate 13 without being transmitted through the second variable retarder 12'. Operation insofar as directing light through both variable retarders 12, 12' to the quarter wave plate 13 would be the same insofar as the quarter wave plate is concerned, as the light 7b incident on the quarter wave plate would be elliptically—in part circularly as to the wavelength intended to be eliminated—polarized.) The actual plane of polarization (in which the electric field vector vibrates) of the linearly polarized light 7c will be a function of the phase retardation characteristics (and, therefore, the elliptical polarization characteristics) of the light 7b, the optical thickness of the quarter wave plate 13, the ordinary and extraordinary indices of refraction characteristics of the variable retarder 12, and the wavelength of the light 7b.

If the retardation characteristics of the quarter wave plate 13 are such that for the wavelength of the light 7 from the source 5 a 90 degree phase retardation occurs in the quarter wave plate 13, then for circularly polarized light 7b, the quarter wave plate 13 will produce linearly polarized light 7c, and the plane of polarization will be parallel to the plane or axis of polarization 23 of the linear polarizer 11. On the other hand, for such wavelength of light, if the light 7b is elliptically polarized (but not circularly polarized), then the output from the quarter wave plate 13 will be linearly polarized, but the plane or axis of polarization will be different than the plane of polarization 23. Moreover, if the light 7b from the variable retarder 12 is circularly polarized, but the quarter wave plate 13 does not provide 90 degree phase retardation for the wavelength of the light 7b incident thereon, then the light 7c will be linearly polarized, but the plane of polarization thereof will not be parallel to the plane of polarization 23.

In view of the foregoing, it will be appreciated that as the variable electrical source 14 changes the voltage applied to the variable retarder 12, the plane of polarization of the light 7c output from the quarter wave plate 13 will be rotated a corresponding amount. The meter 15 may be used to indicate the voltage applied by the source 14 to the variable retarder 12 and in fact may be calibrated in the sense of angular rotation or position of the plane of polarization of the output light 7c from the quarter wave plate 13. The voltage applied by the source 14 may be varied as a function of an input 17 thereto. Such input 17 may be a manual adjustment, e.g., a variable potentiometer or other similar device, or such input may be an automatic or electronic one from another source, such as a computer, a feedback device, a servo system, etc.

Figure 3:
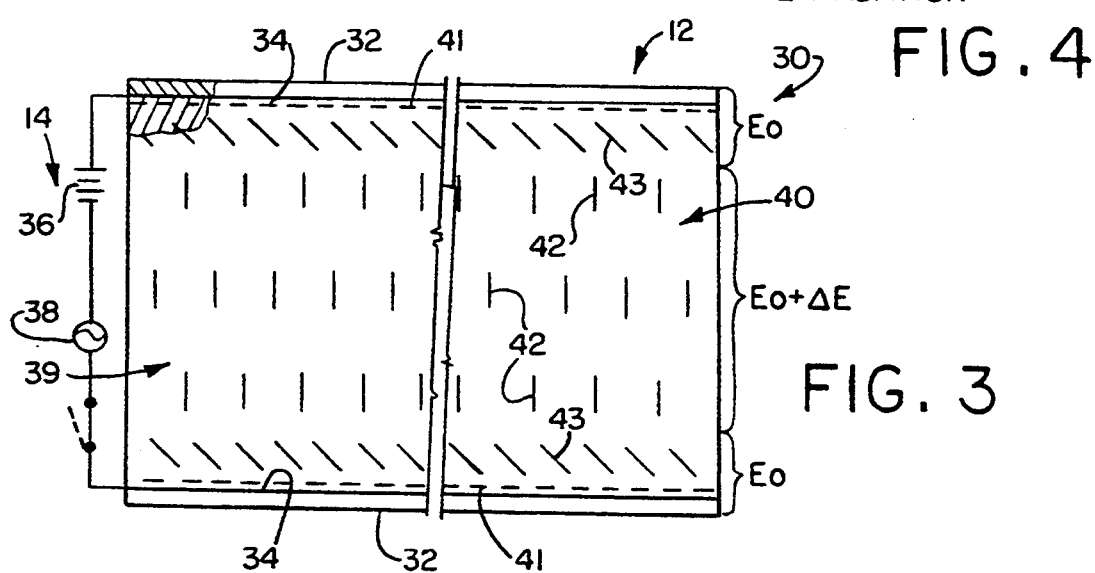
FIG. 3 is a schematic side elevation view of a liquid crystal cell serving as a variable retarder in accordance with the present invention.

Turning to FIG. 3, a liquid crystal cell 30, which may serve as the variable retarder 12, is schematically illustrated. The cell 30 includes a pair of optically transparent plates 32, for example of glass, which preferably are coated with transparent electrically conductive material 34 that serve as electrodes to apply electric field across the liquid crystal in the cell. The variable electrical source 14 is depicted as a fixed voltage, e.g., a DC or even an AC, if desired, bias source 36 and an AC signal source 38. The source 38 produces a relatively high frequency signal, e.g., 10 Hz to 500 KHz. The sources 36, 38 are coupled in electrical series and are coupled across the conductive electrodes 34, for example in the manner illustrated. Conventional means may be provided to adjust, to increase or to decrease, the voltage of either or both of the sources 36, 38 and/or to switch one or both of the voltages on and off.

In the interior volume 39 of the cell 30 is liquid crystal generally designated 40. The liquid crystal preferably is nematic liquid crystal or at least operationally nematic liquid crystal, and such liquid crystal preferably has positive dielectric anisotropy and is birefringent. As is known, the structural organization, alignment, arrangement, etc., of the nematic liquid crystal tends to be linear, tends not to be arranged in layers, and tends to be influenced to a large extent by the structural orientation at the surface or boundary between the liquid crystal material and the medium or material containing the liquid crystal material in the absence of a prescribed input, such as an electric field. However, in the presence of an electric field, the liquid crystal will tend to become aligned with respect to the field, e.g., in parallel with the field (or perpendicular to the field, depending on whether the liquid crystal has positive or negative dielectric anisotropy characteristics), and the extent of such alignment throughout the mass of liquid crystal material in the liquid crystal cell will be a function of the magnitude of the input and of the conditions and energy at the boundaries. As the field increases or decreases, the liquid crystal aligns more or less with respect to the field and, thus, causes less or more phase retardation. Thus, the effect of changing the field the changing of the effective optical thickness of the liquid crystal cell 30, variable retarder 12.

In the liquid crystal cell 30, as is described in the above-mentioned U.S. patents, the surfaces of the plates 32 or electrodes 34 are rubbed or are otherwise treated, e.g., with the application of a material that subsequently is rubbed or is applied in a certain fashion, to achieve an orientation of the liquid crystal proximate those plates in a direction generally parallel to the plates or fairly close to parallel. That liquid crystal which is located near the plates 32 will present an optical axis to incident light generally transverse to the direction of the incident light so as to exhibit a desired birefringence and/or phase retardation effects mentioned above and also will determine the optical axis of the variable retarder since that liquid crystal which is directly adjacent the plates will tend to remain parallel to the rubbing or treatment direction mentioned during various operations of the variable retarder. That liquid crystal 40 which is proximate the plates 32 is designated by reference numeral 41 in FIG. 3. The parallel alignment of liquid crystal structure parallel to the surfaces of the plates 32 defines the optical axis of the cell 30 in the X,Y plane thereof, i.e. orthogonal to the Z direction of propagation of light through the cell.

The bias voltage source 36 is intended to provide adequate voltage and electric field across the liquid crystal 40 so as to cause alignment in parallel with the field of that liquid crystal 42, which is generally located in a center area of the liquid crystal cell 30 and is not directly adjacent or proximate the plates 32. As is described in the above patents, a larger voltage is required to cause alignment with respect to electric field for that liquid crystal which is proximate the plates 32 compared to the voltage required to effect alignment for that liquid crystal nearer the center of the cell, e.g., due to surface energy and boundary conditions. That liquid crystal 42 which is aligned with the applied field preferably essentially has the optical axis thereof in parallel with the direction of propagation of light therethrough so as to have no impact or, in any event, relatively little impact on the transmitted light, especially on the phase retardation characteristics of quadrature components of the transmitted light.

In the absence of a voltage applied by the source 38, that liquid crystal 43, which is between the liquid crystal 41, which is generally parallel or close to parallel to the plates 32, and the liquid crystal 42, which is aligned with respect to the applied field from the bias source 36, tends to be oriented in a somewhat diagonal or slanted configuration, as is seen in FIG. 3, for example, being a transition layer between the two layers of liquid crystal 41, 42.

The actual thickness of the respective layers of liquid crystal 41, 42 and 43 will be a function of the magnitude of electric field applied across the liquid crystal cell 30. The greater the field, the thicker will be the layer of liquid crystal 42 aligned with respect to the field and the thinner will be the layers of liquid crystal 41, 43. Indeed, in the optimal case, in response to a maximum electric field that is not too great as to burn through the cell, all liquid crystal in the cell would tend to align in parallel with respect to the field. In practicality, that liquid crystal which is immediately adjacent the plates 32 will tend not to align with respect to the field or, in any event, will still maintain a component of alignment that is in parallel with the plates. Thus, the layer of liquid crystal 43 that is sloping also may not be able to be totally aligned with respect to the applied electric field but may be substantially aligned so as to minimize the amount of light transmission therethrough that follows a path across the optical axis thereof.

As light is transmitted through liquid crystal that is oriented such that the light crosses the optical axis thereof, the liquid crystal tends to slow one of the quadrature components of the transmitted light relative to the other quadrature component. The larger the thickness of the liquid crystal layer through which the light is transmitted, the larger will be the relative phase retardation. Therefore, in the absence of an applied electric field other than that which aligns the liquid crystal 42 near the center of the cell 30, substantial phase retardation will occur for light transmitted through the cell. In response to application of a maximum electric field, e.g., with the maximum voltage applied by the sources 36, 38, the phase retardation will be minimized.

Several advantages inure to the use of the surface mode liquid crystal cell 30 in the present invention. Such cell can be readily controlled as a function of voltage to alter phase retardation or phase separation characteristics of the extraordinary and ordinary quadrature light components of the transmitted light. Such cell is relatively fast acting since the majority of switching of liquid crystal alignment occurs relatively proximate the surfaces while that liquid crystal at and near the center of the cell remains biased to alignment according to the source 36. Further, since the cell can be relatively thick without sacrificing speed of response, problems of burn-out or burn through are minimized.

A graph showing the phase separation for the ordinary and extraordinary quadrature components of light transmitted through a variable retarder liquid crystal cell in response to applied electric field is shown in FIG.

4. As the field increases on the ordinate, the amount of retardation decreases on the abscissa, and the converse also is true.

The analyzing component/quarter wave plate 13 described above with reference to the apparatus 10 of FIG. 1 may be a variable device that is able to be tuned to provide quarter wave plate function with respect to respective wavelengths of light 7 generated by the source 5. More specifically, the effective thickness of the analyzing device 13 can be changed so that for the particular undesirable wavelength of the light 7 intended to be blocked, such analyzing device, in fact, is a quarter wave plate. Therefore, as a function of the wavelength of the light 7, the analyzing device 13 can be tuned such that in response to incident light 7b that is circularly polarized, the light 7c will be linearly polarized and will have a plane of polarization that is parallel to the axis 23 of the linear polarizer 11.

An exemplary tunable analyzing device 13 may be, for example, a further variable retarder that is substantially the same as the variable retarder 12 described above. For this reason, a connection from the source 14 is shown to the device 13 to provide a separately adjustable field across the liquid crystal of such tunable device 13. As the voltage and, thus, the electric field is increased, the amount of retardation and, thus, the effective optical thickness or phase retarding thickness of the analyzing device 13 is reduced. As the voltage is decreased, the optical thickness or phase retarding thickness increases. By changing such effective thickness of the analyzing device 13, the analyzing device 13 can be tuned to be a true quarter wave plate for the particular wavelength of light from the source 5 being transmitted through the apparatus 10 and intended to be blocked by the analyzer 4. The apparatus 10 also includes a second variable retarder 12'', which is identical to the variable retarder 12. The variable retarders may be operated in push-pull fashion, as is disclosed in the above reissue patent to increase speed of response of the variable rotation polarizer 2, and to increase accuracy and linearity of operation thereof.

A computer may be used to effect automatic control of the various functions, operations and features of the apparatus 10 just described. Other automatic mechanisms also may be used to achieve the desired rotation of the plane of polarization of light incident to the variable rotation polarizer 2 of the present invention.

It is noted, too, that the light source 5 may be a laser. Since a laser produces light that is linearly polarized, in such case the linear polarizer 11 may be unnecessary.

The variable rotation dispersion device 3 shown in FIG. 1 includes a pair of transparent plates 50, e.g., of glass, that preferably are flat, are in parallel spaced-apart relation to each other, and are sealed about the edges by a conventional seal 51 to define a volume 52 within a variable dispersion medium 53 is contained. According to the preferred embodiment, the variable dispersion medium is a cholesteric liquid crystal material. An example of such material is formed of 10% cholesterol chloride, 28% cholesterol nonanoate, 30% pentylphenylmethoxybenzoate, and 32% pentyloxybenzoate. Such material is a cholesteric liquid crystal that rotates the polarization of incident light as a function of the wavelength of such incident light; the amount of such rotation would be a function of the thickness of the liquid crystal material 53 through which the light passes. The nature of such rotation is described in the above-mentioned Fergason paper. The spacing of the plates 50 should be such that the thickness of the variable dispersion medium will rotate plane of polarization of an undesired wavelength of light by a prescribed amount so as to achieve blocking of such wavelength of light by the analyzer 4. In the preferred embodiment, such spacing or thickness is on the order of from about 5 microns to about 15 microns, the smaller thickness being preferred.

With the foregoing in mind, then, it will be appreciated that the notch filter 1 of the present invention will filter a prescribed wavelength of light so as to block transmission of such wavelength. The variable rotation polarizer 2 is operative automatically, e.g., according to a detector which senses the wavelength of the undesirable incident light, or manually (by dialing in a prescribed wavelength to be eliminated) in response to the voltage/electric field applied thereto to convert the input light to linearly polarized light. The automatic or dialed in value of wavelength (which may be the voltage and field applied to the variable retarder and the adjustment of the tunable quarter wave plate 13) causes the variable rotation polarizer 2 to rotate the plane of polarization of such light so that when such light passes through the variable dispersion device 3, the plane of polarization of the undesired wavelength is linearly polarized and has been rotated an extent which places it in crossed relationship to the analyzer 4. The analyzer 4 blocks such undesired wavelength and passes at least a portion of the balance of the light incident thereon, which is not in such crossed relation.

I claim:

1. Apparatus for filtering a wavelength of light, comprising a variable polarization rotator means for supplying input light at a prescribed angle of polarization, variable dispersion means for rotating the plane of polarization of polarized light received thereby an amount that is a function of the wavelength of such input light, and first analyzer means having an axis of polarization for blocking transmission of that light which is output by said variable dispersion means and has a plane of polarization which is crossed relative to the axis of polarization of said first analyzer means, said variable polarization rotator means comprising input means for furnishing linearly polarized input light, variable retarder means for retarding the phase of one quadrature component of such linearly polarized input light an amount relative to the phase of the other quadrature component, and second analyzing means for converting such quadrature components to linearly polarized light having a plane of polarization that is a function of the amount of such phase retardation, said variable dispersion means comprising a cholesteric liquid crystal material, and said cholesteric liquid crystal material comprising a mixture comprised of 10% cholesterol chloride, 28% cholesterol nonanoate, 30% pentylphenylmethoxybenzoate, and 32% pentyloxybenzoate.

2. Apparatus for filtering a wavelength of light, comprising a variable polarization rotator means for supplying input light at a prescribed angle of polarization, variable dispersion means for rotating the plane of polarization of polarized light received thereby an amount that is a function of the wavelength of such input light, and analyzer means having an axis of polarization for blocking transmission of that light which is output by said variable dispersion means and has a plane of polarization which is crossed relative to the axis of polarization of said analyzer means, said variable dispersion means comprising a cholesteric liquid crystal material, and said cholesteric liquid crystal material comprising a mixture comprised of 10% cholesterol chloride, 28% cholesterol nonanoate, 30% pentylphenylmethoxybenzoate, and 32% pentyloxybenzoate.

3. Apparatus for filtering a wavelength of light, comprising a variable polarization rotator means for supplying polarized input light of plural wavelengths at a prescribed angle of polarization, said rotator means being operable selectively to rotate the plane of polarization of such light substantially continuously over an angle of rotation as a function of a prescribed input to said rotator means, color dispersion means optically downstream of said rotator means for rotating the plane of polarization of light received thereby an amount that is a function of the wavelength of such received light, and analyzer means having an axis of polarization aligned for blocking transmission of that color light which is output by said color dispersion means that has a plane of polarization which is crossed relative to the axis of polarization of said analyzer means while transmitting other wavelength light, said rotator means comprising a variable optical retarder, wherein said variable polarization rotator means and color dispersion means are cooperative to cause a prescribed direction of plane of polarization of said wavelength of light to be filtered to be blocked by said analyzer means, wherein said variable retarder converts incident plant polarized light to elliptically polarized light, and said variable polarization rotator means further comprises a birefringent means for converting such elliptically polarized light to plane polarized light, and said birefringent means comprising a variable birefringent means that is tunable for converting incident elliptically polarized light to plane polarized light with the direction of plane polarization of the wavelength of light intended to be blocked by said analyzer means being aligned in a prescribed direction for such cooperation with said color dispersion means to be blocked by said analyzer means.

4. Apparatus for selectively filtering a wavelength of light from multiwavelength incident light, comprising a variable retarder to convert incident plane polarized light to elliptically polarized light, a birefringent means for converting elliptically polarized light to plane polarized light having a direction of plane of polarization that is a function of the ellipticity of the light incident thereon, color dispersion means for rotating the plane of polarization of the wavelength of light intended to be filtered a prescribed amount, and analyzer means for blocking light such wavelength of light intended to be filtered while being able to transmit other wavelength of light.

5. The apparatus of claim 4, said birefringent means comprising a quarter wave plate for the wavelength of light intended to be filtered.

6. The apparatus of claim 5, said quarter wave plate being tunable.

7. The apparatus of claim 6, said quarter wave plate comprising a liquid crystal variable retarder.

8. The apparatus of claim 4, said analyzer means comprising a plane polarizer having an axis of polarization that is crossed relative to the direction of plane of polarization of the light of the wavelength intended to be filtered.

* * * * *